(12) United States Patent
Lambert et al.

(10) Patent No.: US 6,631,165 B1
(45) Date of Patent: Oct. 7, 2003

(54) CODE MODULATION USING NARROW SPECTRAL NOTCHING

(75) Inventors: Russell H. Lambert, Fountain Valley, CA (US); Peter J. Hadinger, Oakton, VA (US); Denes L. Zsolnay, Rolling Hills Estates, CA (US); Bruce W. Evans, Redondo Beach, CA (US); Shi-Ping Hsu, Pasadena, CA (US); Gerard Roccanova, Huntington Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/388,175

(22) Filed: Sep. 1, 1999

(51) Int. Cl.[7] .......................... H04L 27/00; H03K 7/08; H04H 5/00

(52) U.S. Cl. .......................... 375/259; 375/238; 381/2; 370/205; 360/60

(58) Field of Search .......................... 380/3, 19; 381/2, 381/71, 93; 370/205; 375/206, 295, 238; 360/60

(56) References Cited

U.S. PATENT DOCUMENTS

| | | | |
|---|---|---|---|
| 3,004,104 A | | 10/1961 | Hembrooke |
| 4,497,060 A | | 1/1985 | Yang |
| 4,853,903 A | * | 8/1989 | Linville et al. ................ 367/39 |
| 4,876,617 A | | 10/1989 | Best et al. |
| 4,937,807 A | | 6/1990 | Weitz et al. |
| 5,113,437 A | * | 5/1992 | Best et al. ..................... 360/60 |
| 5,245,665 A | * | 9/1993 | Lewis et al. ................... 381/93 |
| 5,579,124 A | * | 11/1996 | Aijala et al. .................... 381/2 |
| 5,828,325 A | * | 10/1998 | Wolosewicz et al. ......... 341/52 |
| 6,014,407 A | * | 1/2000 | Hunsinger et al. .......... 370/208 |
| 6,438,236 B1 | * | 8/2002 | Best et al. ...................... 381/2 |

* cited by examiner

Primary Examiner—Stephen Chin
Assistant Examiner—Edith Yeh
(74) Attorney, Agent, or Firm—McAndrews, Held & Malloy, Ltd.

(57) ABSTRACT

A method (100) and apparatus (400) for encoding and decoding data in a signal using notch depth modulation. The method (100) of data to be encoded in the signal. The method then notch filters (125) the signal according to the frequency notch representation of the data. The apparatus (400) for encoding data comprises an digitizer (405) to digitize the signal. A code former (420) provides the data to be encoded in the signal. A notch filter (430) notch filters the signal according to the data. Decoding the data converts the signal into a frequency domain representation (520) and determines the notch spectral content (525) of the signal at selected notch frequencies. The method (500) establishes notch thresholds (534) at each of the selected notch frequencies, then decodes the data (540) from the signal by comparing the notch spectral content to the notch thresholds.

27 Claims, 9 Drawing Sheets

CODE MODULATION USING NARROW SPECTRAL NOTCHING

BACKGROUND OF THE INVENTION

The present invention relates generally to code modulation. More specifically, the present invention relates to encoding a signal with data using spectral notching.

Many situations exist in which it is desirable to encode data in a signal which is already carrying information. It is further desirable to encode the data in a signal without adversely affecting the communication taking place using the signal.

One such situation exists in broadcast communications. In television, for example, it is sometimes desirable to communicate additional information to the destination in addition to the traditional video and audio information. The additional information may be used by decoding apparatus at the destination to assist in decoding coded video and audio data. The additional information may also be used for broadcast verification in which a company may, for example, monitor the broadcast of commercials. A further application involves the use of the additional information for audience monitoring in which the additional information is used to monitor audience viewing habits.

In broadcast communications, the available bandwidth for broadcasting information is limited. The available bandwidth is typically allocated between video and audio information leaving little, if any, bandwidth for additional information. Thus, it is desirable to be able to encode the additional information in the existing video or audio channels. A further advantage of encoding additional information in an audio or video channel is that televisions come equipped with apparatus necessary for the receipt of audio and video channel signals. However, since televisions typically directly convert the video and audio channels into video images and audio that the end user observes, the challenge is to encode the additional information in such a way that the user is not aware of its existence.

In the past, attempts have been made to encode additional information into audio channels. Some attempts inserted information in frequencies out of the audio range. Those attempts, however, suffered from poor data rates and the ability of many pets and people with excellent hearing to perceive the often discomforting additional frequencies. Other attempts, such as that disclosed in U.S. Pat. No. 5,828,325, titled "Apparatus and Method for Encoding and Decoding Information in Analog Signals", involved the manipulation of time domain audio signals. Such attempts typically affected the quality of the audio channel in such a way that users could detect the manipulations.

Other attempts, such as that disclosed in U.S. Pat. No. 4,876,617, titled "Signal Identification", completely eliminated frequency ranges which were subsequently used to insert coding signals. Such attempts suffered from the ability of users to perceive the inserted coding signals which were inserted within the audio range.

Thus, a need has long existed in the art of broadcast communications for a method and apparatus for encoding data on a signal that does not appreciably affect the integrity of the signal.

SUMMARY OF THE INVENTION

Accordingly, it is an object of the present invention to provide a method and apparatus for encoding data in a signal using notch depth modulation.

It is a further object of the present invention to provide a method and apparatus for decoding data which has been encoded in a signal using notch depth modulation.

It is a still further object of the present invention to provide a method and apparatus for inaudibly communicating data in an audio signal.

One or more of the foregoing objects is met in whole or in part by a preferred embodiment of the present invention that provides a method and apparatus for encoding data in a signal using notch depth modulation and decoding data from a signal in which the data has been encoded using notch depth modulation.

The method determines the data to be encoded in the signal. The method then determines a frequency notch representation of the data. The method converts the signal into a digital representation which is subsequently notch filtered according to the frequency notch representation. The method then converts the notch filtered digital signal into a coded analog signal for subsequent transmission.

The method further comprises decoding data from a coded signal in which the data has been encoded using notch depth modulation. The method converts the coded signal into a digital representation which is further converted into a digital frequency domain representation. The method analyzes selected notch frequencies in the digital frequency domain representation to determine notch depths at each of the selected notch frequencies. The method analyzes frequencies between the selected notch frequencies in the digital frequency domain representation to determine notch thresholds at each of the selected notch frequencies. The method decodes the data from the coded signal by comparing the notch depths at the selected notch frequencies to the respective notch thresholds and converting the results of the comparison to the decoded data.

The apparatus of the preferred embodiment includes encoding apparatus comprising an A/D converter for converting an original signal into a digitized signal. The apparatus includes a code former which provides the data to be encoded in the original signal. The apparatus includes a notch filter which notch filters the digitized signal according to the data. The notch filter preferably includes an infinite impulse response filter to filter notches into the digitized signal according to the data. The apparatus also includes a D/A converter to convert the digitized coded signal to an analog signal.

The apparatus of the preferred embodiment also provides decoding apparatus including a digitizer for converting a coded analog signal into a coded digitized signal. The apparatus includes a Fourier transform circuit to convert the coded digitized signal into a frequency domain representation. The apparatus includes a threshold determiner for determining notch thresholds at selected notch frequencies. The threshold determiner preferably includes a between-notch spectral level determiner. The apparatus further includes a data detector which detects raw data in the signal by comparing spectral levels at selected notch frequencies with the notch thresholds. A decoder then converts the raw data into decoded data.

DETAILED DESCRIPTION OF THE PREFERRED EMBODIMENT

Figure 1:
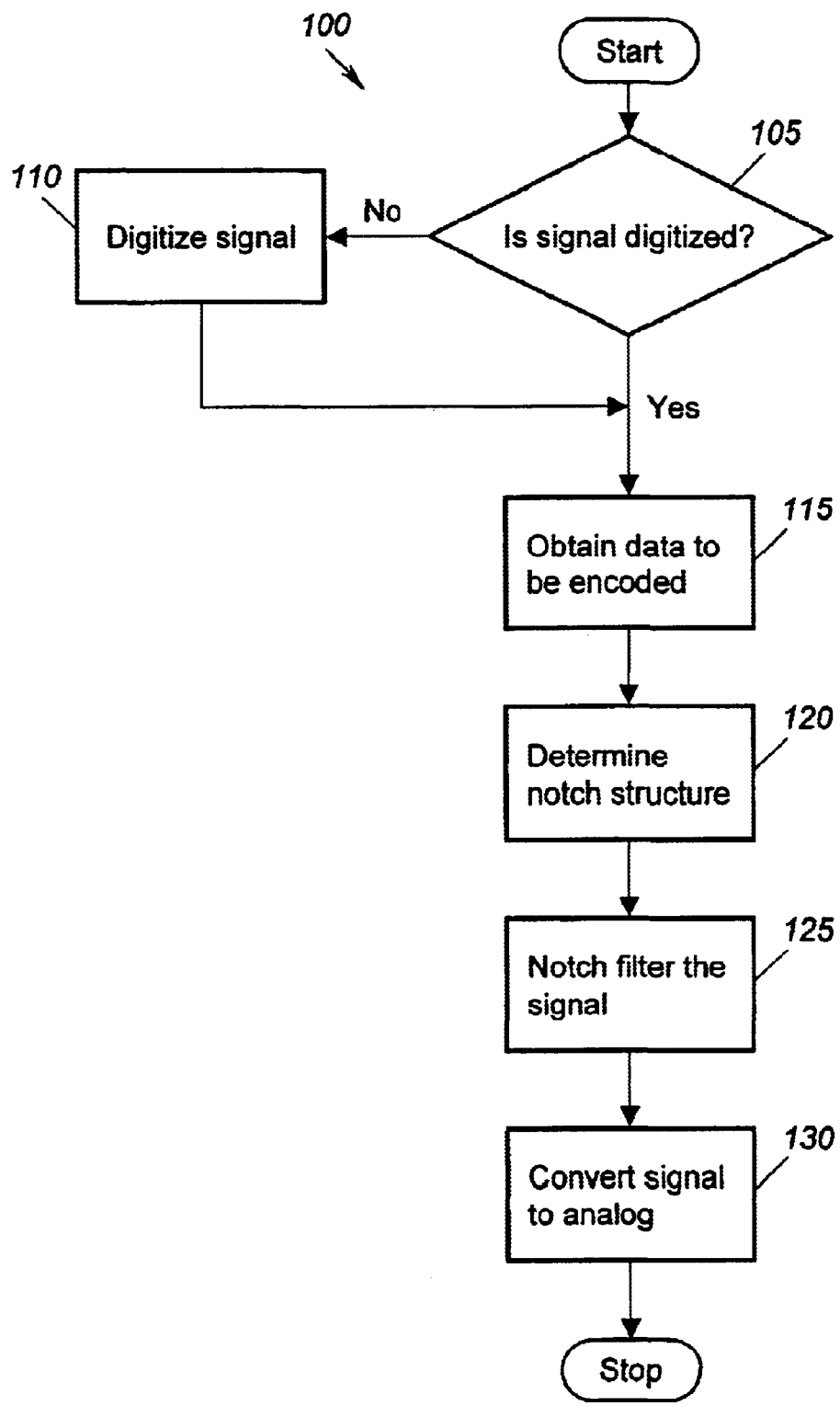
FIG. 1 illustrates a method for encoding data in a signal using notch depth modulation.

FIG. 1 illustrates a method 100 for encoding data in a signal using notch depth modulation. The signal may, for example, be an audio channel signal in a broadcast system. Step 105 decides if the signal is in a digitized format. If the signal is not in a digitized format, step 110 converts the signal into a digitized signal. Step 110 may, for example, include analog band-pass filtering, automatic gain control, and conventional A/D conversion.

Once the signal is in a digitized format, step 115 obtains the data to be encoded in the signal. The data may, for example, comprise a broadcast program ID, time stamp, date stamp, message or commercial ID to be encoded into the signal. The data may be a predetermined code or may be determined in real time.

After the data is obtained, step 120 determines the notch structure corresponding to the data. The notch structure includes a set of frequency spectral notches (also referred to as a comb of notches), the characteristics of which represent the data. The characteristics of the notches used to represent the data include notch depth, and optionally notch width and location. The available notch frequencies are those predetermined frequencies which may be notched to carry data as described below.

For example, in a system in which data is encoded in an audio signal, a notch structure may include 60 potential notch frequencies, with an average spacing of 50 Hz, for the comb of notches. The spacing between the potential notch frequencies may be uneven, or preferably pseudo-randomized, to enhance the inaudibility of the data coded into the signal or to make the system unusable by non-authorized parties. From the set of potential notch frequencies, step 120 determines the set of notch frequencies at which notches will be inserted.

Using digital filtering technology, the widths of the notches may be chosen to be very narrow. For example, in the preferred embodiment, the notch width may be approximately 0.0025 Hz measured at the −50 dB point. In the audio signal example, there is a tradeoff between inaudibility and data error rate when determining notch width. Wider notches are easier to detect and lead to lower error rates, but also lead to lower inaudibility. In the preferred embodiment, the notch width is a set predetermined value. However, in practice, the method may adjust the notch width in real time according to measured communication parameters, such as inaudibility, signal noise levels and data error rates.

In notch depth modulation, spectral notch depths represent the data. In the case of encoding binary symbols in the signal, a notch at a selected notch frequency may represent a logic one (true) data bit, and the absence of a notch at a selected notch frequency may represent a logic zero (false) data bit. In the more general case, a notch at a selected notch frequency may represent an N-bit data symbol. A notch with $2^N$ potential notch depths may represent the $2^N$ possible states of the N-bit data symbol.

Once step 120 determines the notch structure representation of the data, including the set of notch frequencies, respective notch depths, and respective notch widths, step 125 notch filters the signal according to the notch structure. Step 125 preferably filters the signal using a digital filtering technique, such as infinite impulse response (IIR) filtering or finite impulse response (FIR) filtering.

After step 120 notch filters the signal, step 130 converts the signal back to an analog representation for subsequent transmission. The resulting analog signal may thus, for example, be modulated to an audio broadcast frequency for transmission. Note that the method may skip step 130 if the desired output signal from the method is a digital signal.

Figure 2:
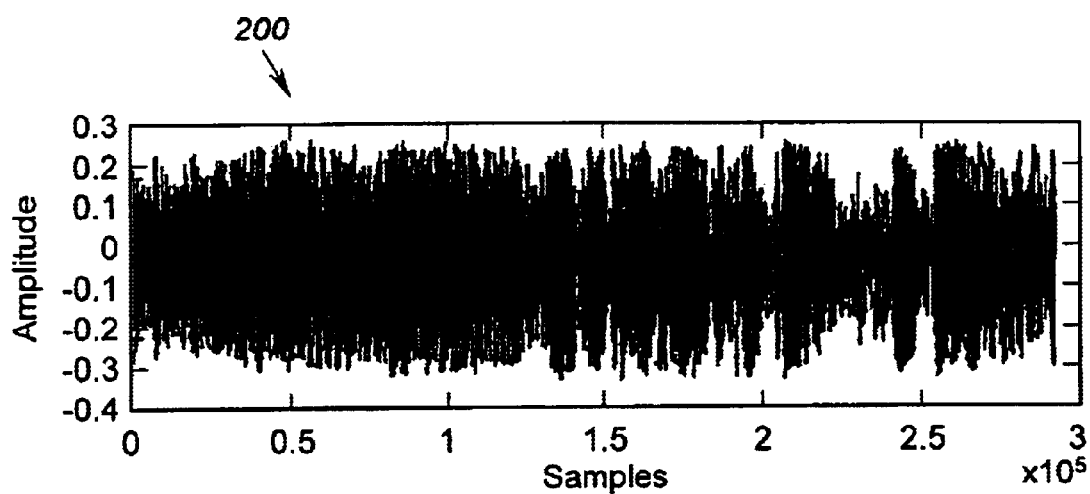
FIG. 2 shows a plot of a sampled time domain signal in which data has been encoded using notch depth modulation.
Figure 3:
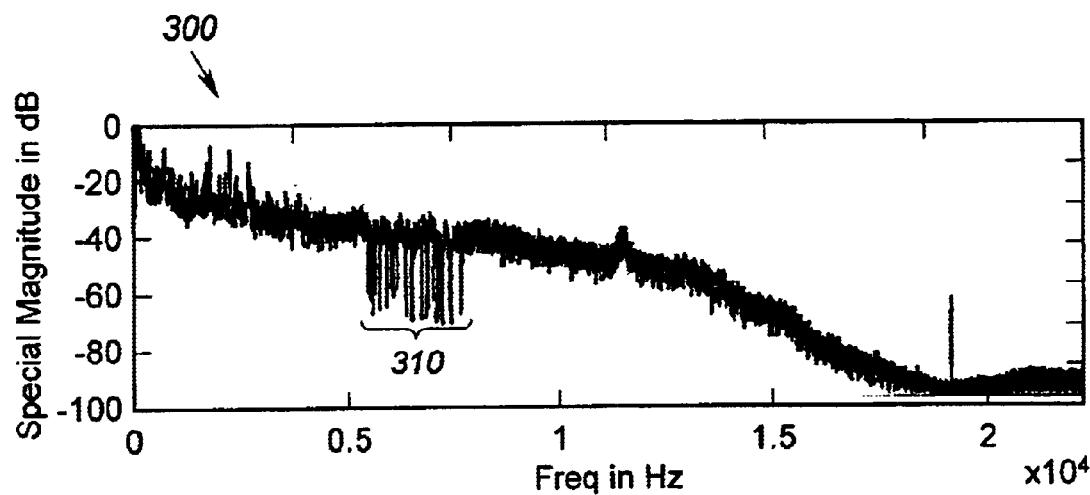
FIG. 3 shows a plot of the frequency spectrum of the time domain signal plotted in FIG. 2.

Turning now to FIG. 2, that figure shows a plot 200 of a sampled time domain audio signal in which data has been encoded using notch depth modulation. The X-axis represents sample number, and the Y-axis represents signal amplitude. FIG. 3 shows a plot 300 of the frequency spectrum of the time domain signal plotted 200 in FIG. 2. The X-axis represents frequency, and the Y-axis represents spectral magnitude. Note the notch comb 310 filtered into the signal at the set of notch frequencies.

Figure 4:
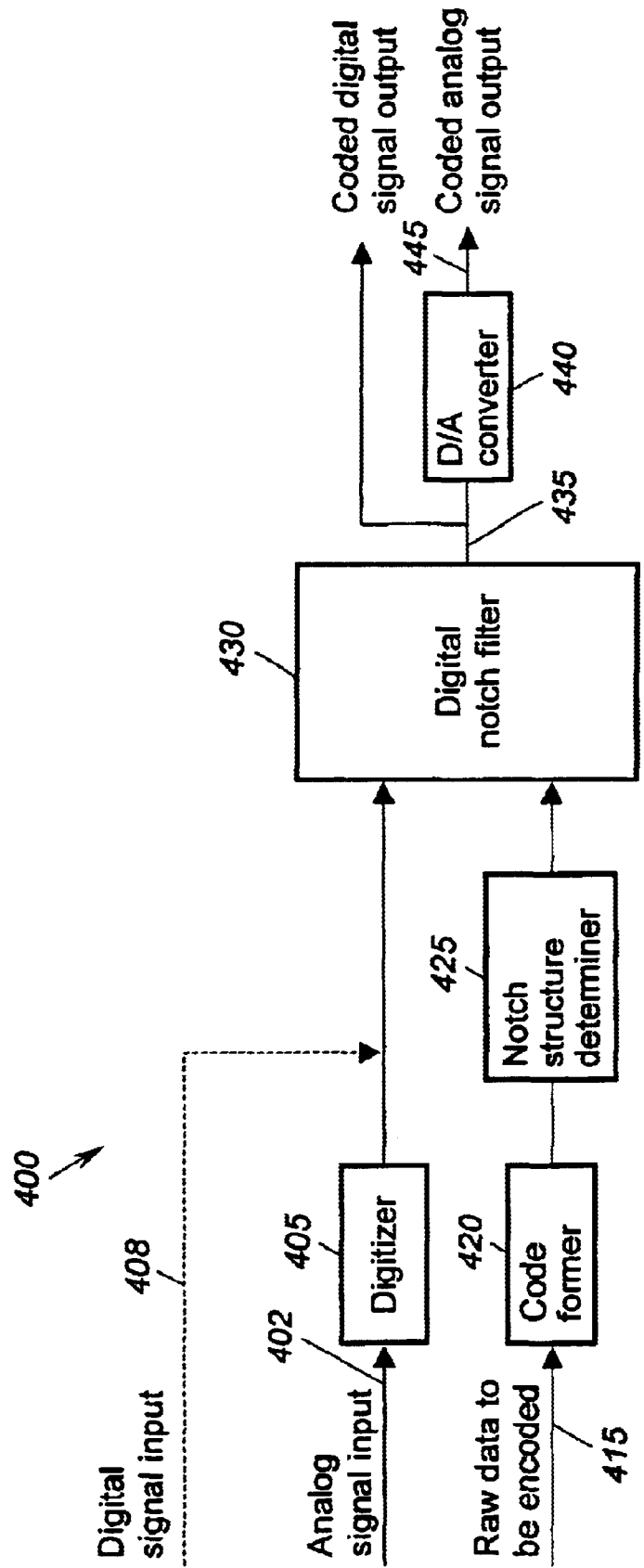
FIG. 4 shows a block diagram of an encoding system for encoding data in a signal using notch depth modulation.

Turning now to FIG. 4, that figure shows a block diagram for an encoding system 400 for encoding data in a signal using notch depth modulation. An analog signal 402 arrives at the digitizer 405, which converts the analog signal into a digital signal. The digitizer 405 may also include an analog band-pass filter, automatic gain controller and A/D converter. The digitizer 405 outputs a digital signal corresponding to the input analog signal 402. Alternatively, a digital signal 408 may be input to the system 400 in a manner which bypasses the digitizer 405.

Raw data to be encoded 415 arrives at the input of a code former 420. The code former 420 provides code data to be encoded in the signal. The code former 420 preferably includes an error correction encoder, such as a Reed-Solomon error correction encoder. The code former 420 converts the raw data 415 to the code data, preferably including error correction information, and outputs the code data to a notch structure determiner 425.

The notch structure determiner 425 converts the code data into a notch structure representation of the code data. Notch structure representation was discussed previously with respect to FIG. 1. The notch structure representation output from the notch structure determiner 425 may include, for example, a set of notch frequencies, respective notch widths, and respective notch depths representative of the code data. The notch structure determiner 425 is preferably implemented with a processor executing software instructions. However, the notch structure determiner 425 may, for example, also be implemented using application specific integrated circuits (ASICs) and/or programmable array logic (PLA) devices. The notch structure determiner 425 outputs the notch structure representation to a notch filter 430.

The notch filter 430 preferably includes a digital filter, such as an infinite impulse response (IIR) filter, to perform notch filtering. However, alternative filter arrangements such as, for example, a Fourier transform circuit coupled to a frequency domain notch filter coupled to an inverse Fourier transform circuit, may also be used. Additionally, an array of hardware notch filters may be utilized.

The notch filter 430 is coupled to the output of the digitizer 405 and to the output of the notch structure determiner 425. The notch filter 430 filters spectral notches into the digital signal from the digitizer 405 according to the notch structure representation of the data code output from the notch structure determiner 425. The notch filter 430 outputs a coded digital signal 435. The encoding system 400 preferably implements the notch filter 430 using a processor executing digital filtering software instructions. However, an ASIC or PAL implementation may also be used.

The D/A converter 440 is coupled to the output of the notch filter 430. The D/A converter 440 converts the coded digital signal 435 output from the notch filter 430 to a coded analog signal 445 for subsequent transmission.

Figure 5:
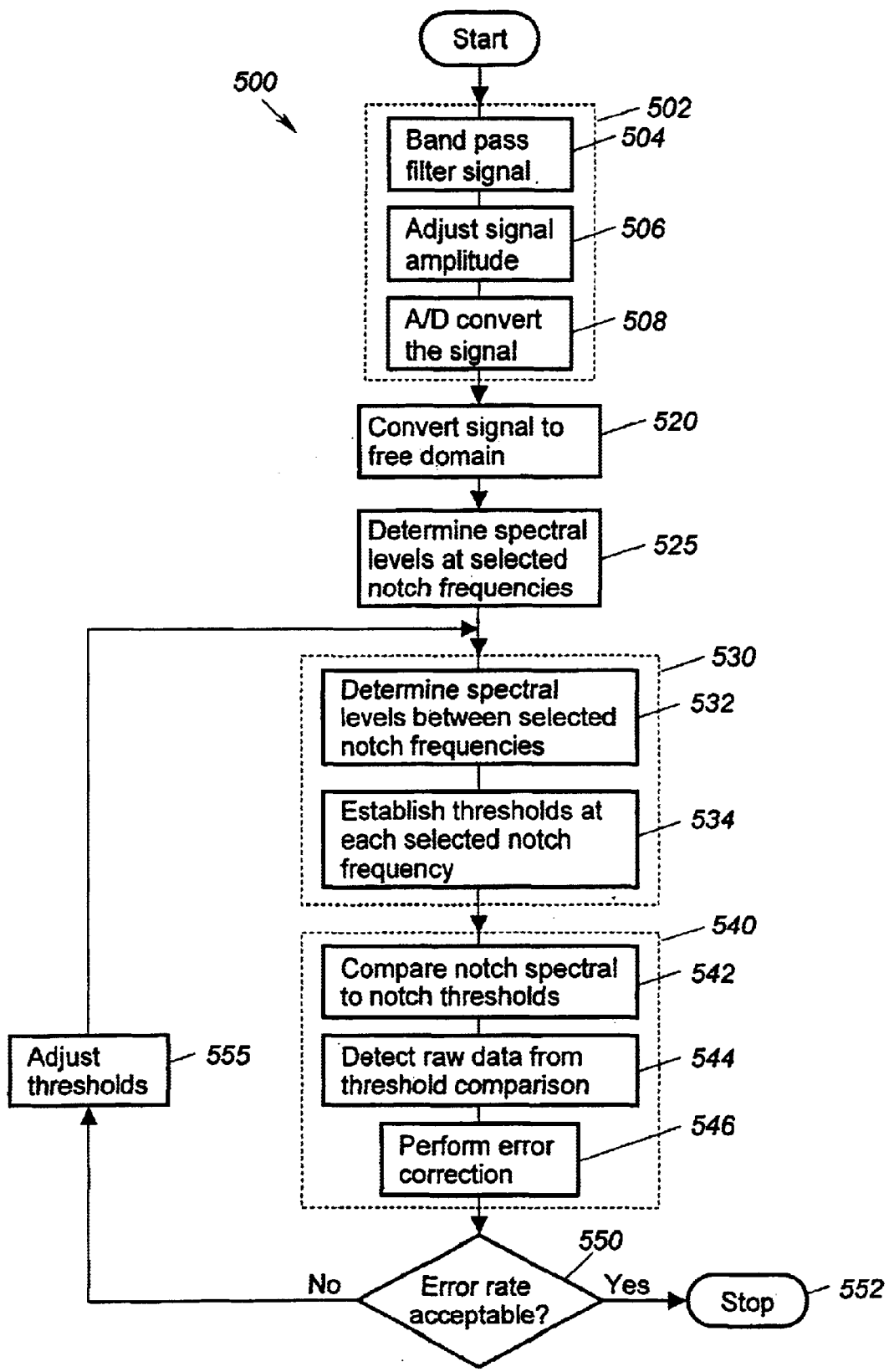
FIG. 5 illustrates a method for decoding data from a signal in which the data was encoded using notch depth modulation.

For the receiving end of a signal that has been encoded with code data using notch depth modulation, the present invention provides a method for detecting the code data in the signal. Referring now to FIG. 5, that figure illustrates a method 500 for decoding data at a receiver from a signal in which the data was encoded using notch depth modulation.

The receiver, at steps 502, converts a received analog signal to a digital signal. The signal digitizing steps 502 may include a band-pass filtering step 504, a signal amplitude adjusting step 506, and an A/D conversion step 508. However, if the signal is already in digital form, the receiver may skip the signal digitizing steps 502.

After steps 502 form a digitized signal, the method converts the signal to a frequency domain representation at step 520. The frequency domain conversion step 520 preferably includes performing a Fourier transform on the digitized signal.

The receiver preferably has knowledge of the set of selected notch frequencies used by the notch depth modulator at the source of the signal. Alternatively, a transmitter may periodically communicate notch information, such as the set of selected notch frequencies to the receiver.

Once the receiver forms a frequency domain representation of the signal at step 520, the receiver determines the spectral levels of the signal at the set of selected notch frequencies at step 525. The receiver then determines notch thresholds at each of the selected notch frequencies at threshold determining steps 530.

The threshold determining steps 530 include a between-notch spectral determining step 532, which determines the spectral levels of the signal at frequencies between each of the set of selected notch frequencies.

The receiver then establishes notch thresholds at each of the set of selected notch frequencies at step 534. The threshold determining step 534 establishes the notch thresholds based on the spectral levels of the signal between the selected notch frequencies. For example, the threshold determining step 534 may average the spectral levels of the signal on each side of a selected notch frequency and subtract a constant attenuation level from that average value.

The number of thresholds, or spectral comparison levels, at each of the set of selected notch frequencies depends on the number of notch depths used for the notch depth modulation. For example, a binary type of notch depth modulation including a notch or a no-notch at a selected notch frequency requires only one notch threshold per selected notch frequency.

Once the receiver has determined the notch spectral levels at each of the selected notch frequencies and has established respective notch thresholds, the receiver performs data detection at steps 540. The data detection steps 540 include a threshold comparison test at step 542, raw data detection at step 544 and error correction at step 546.

The threshold comparison step 542 compares the notch spectral levels with the respective notch thresholds at each of the set of selected notch frequencies. Step 544 then determines the raw coded data by analyzing the results of the threshold comparison step 542. The method 500 then performs error correction on the raw coded data at step 546 using the error correction scheme used during the modulation phase, for example, Reed-Solomon error correction. The error correction step 546 determines the data originally encoded by the notch depth modulator at the source of the signal.

As the receiver detects data from the signal, notch thresholds are preferably continually established and tuned. In addition to decoding the detected raw data according to the appropriate error correction scheme, the error correction step 546 also determines the data error rate for the data detection. The threshold test step 550 decides whether the data error rate is acceptable.

If the data error rate is acceptable, the decoding of the coded data is complete 552. However, if the threshold test step 550 determines that the data error rate is unacceptable, the receiver performs the threshold adjustment step 555. The threshold adjustment step 555 adjusts the notch thresholds in an attempt to reduce the overall data error rate of the detected data. For example, the threshold adjustment step 555 may add or subtract a constant attenuation level from the notch thresholds.

Following notch threshold adjustment at step 555, method 500 execution returns to the data detecting steps 540, which then perform data detection using the adjusted notch thresholds.

Figure 6:
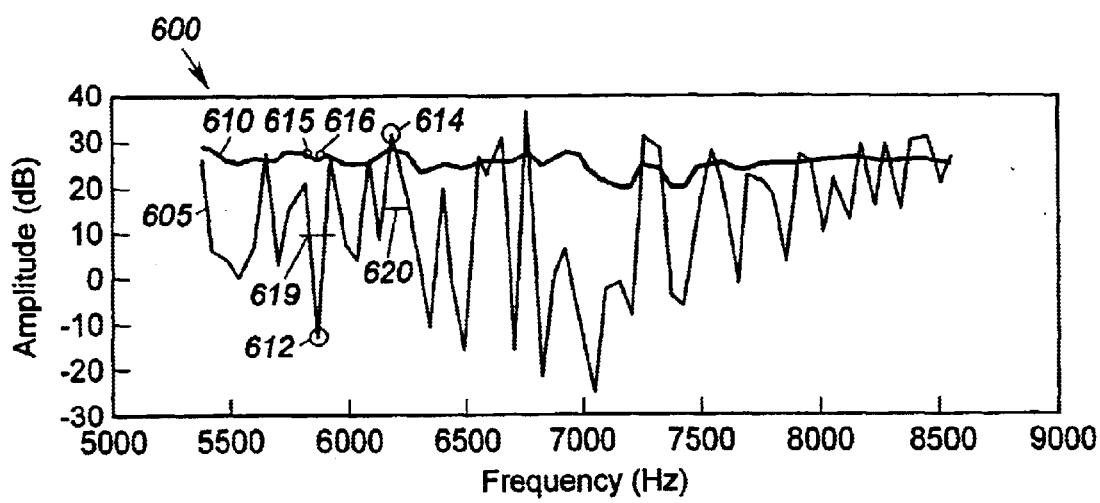
FIG. 6 shows plots of notch spectral level and between-notch spectral level for a signal in which data was encoded using notch depth modulation.

Turning now to FIG. 6, that figure shows a plot 600 of notch spectral level 605 and between-notch spectral level 610 for a signal in which data was encoded using notch depth modulation. The plot of notch spectral level 605 illustrates the spectral level determined at each of the set of selected notch frequencies, measured in decibels.

The plot of between-notch spectral levels 610 illustrates the spectral level determined between each of the selected notch frequencies. The plot points used to form the between-notch spectral level plot 610 were moving averaged to smooth the plot 610.

The receiver preferably uses the between-notch spectral levels 610, at least in part, to determine notch thresholds. For example, to determine a notch threshold for the notch spectral level point 612 (approximately −14 dB), the receiver may first average the between-notch spectral levels at points 615 (approximately 27 dB) and 616 (approximately 26 dB) resulting in approximately 26.5 dB. Then the receiver may then subtract an attenuation factor (such as −17 dB) to yield the notch threshold 619 of approximately 9.5 dB. Note that for the preceeding example, the receiver determines one threshold per notch. In general, the receiver may determine a set of thresholds for each of the selected notch frequencies.

The receiver then compares the determined notch thresholds at each of the selected notch frequencies to the corresponding determined notch spectral levels 605 to detect raw coded data. For example, the notch spectral level at point 612 is below the determined threshold 619. Thus, the receiver may decode a logic level of one (true) for that particular notch 612.

Figure 7:
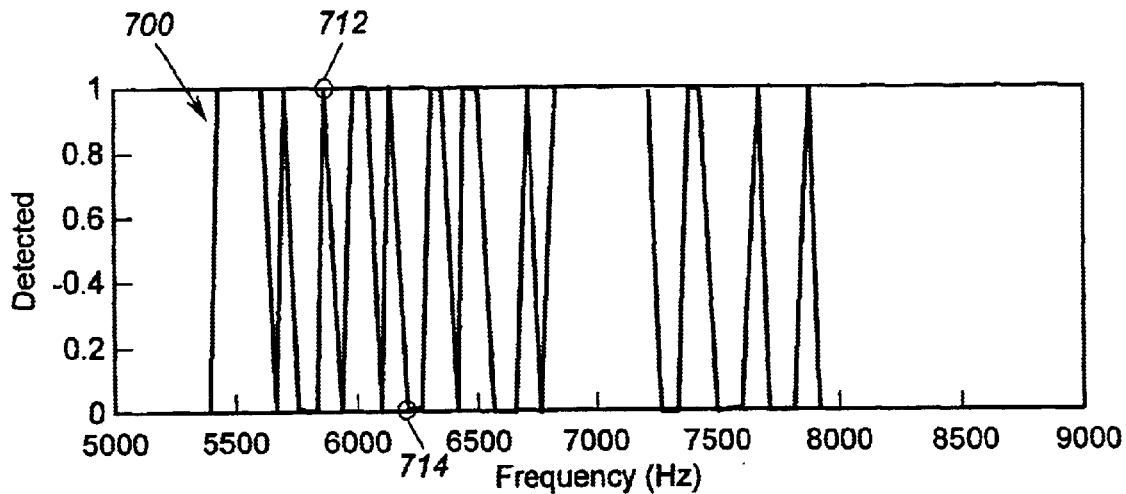
FIG. 7 shows a plot of data decisions made from a signal in which the data was encoded using notch depth modulation.

Referring to FIG. 7, that figure shows a plot of raw data decisions 700 made from the notch spectral levels 605 shown in FIG. 6 and using respective notch thresholds based, at least in part, on the between-notch spectral levels 610 shown in FIG. 6. For example, the notch spectral level 612 shown in FIG. 6 resulted in the logic level 1 raw data decision 712 shown in FIG. 7. Likewise, the notch spectral level 614, when compared to the corresponding notch threshold 620, resulted in the logic level 0 raw data decision 714 shown in FIG. 7.

Figure 8:
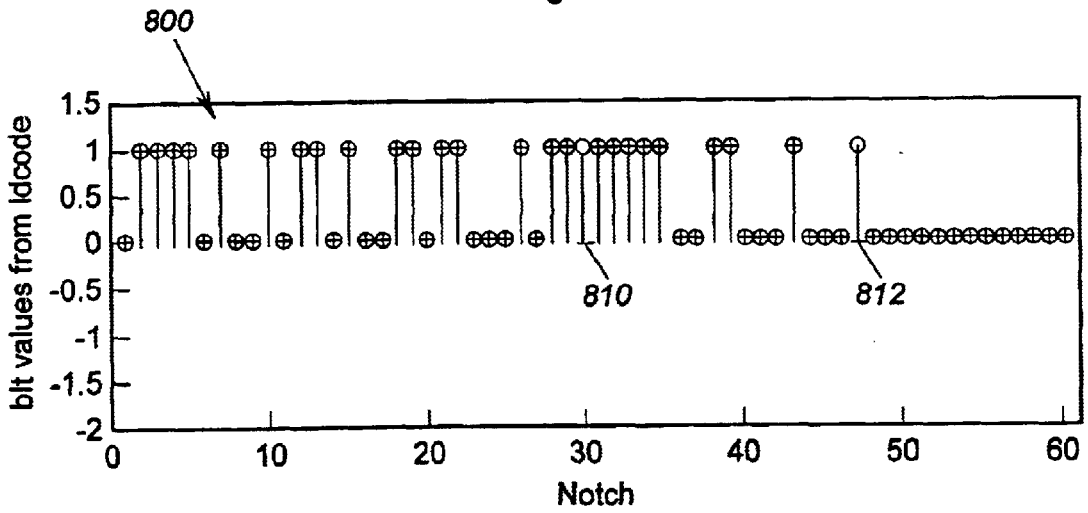
FIG. 8 shows a plot of binary data detected from a signal in which the binary data was encoded using notch depth modulation.

Turning now to FIG. 8, that figure shows a plot 800 of binary data corresponding to the raw data decisions 700 illustrated in FIG. 7. In FIG. 8, "o" denotes detected data values, and "+" denotes correct data values. Note that for the notch thresholds chosen for the data detection, there were two detected data bit errors 810, 812. These two raw data bit errors 810, 812 were subsequently detected and corrected using the Reed-Solomon error correction that was encoded with the coded data.

Figure 9:
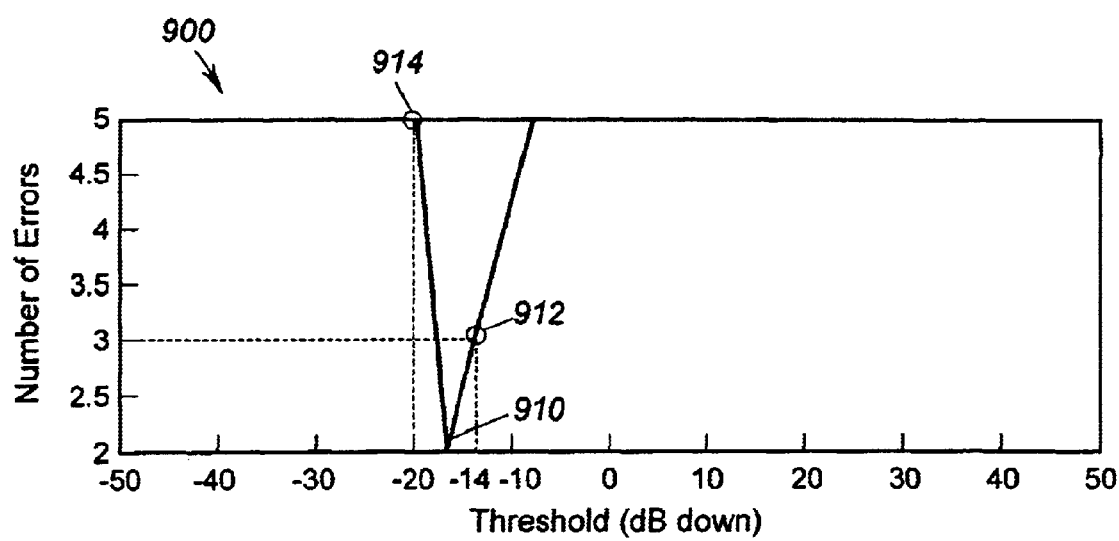
FIG. 9 shows a plot illustrating threshold determination according to the error rate of detected data.

Referring to FIG. 9, that figure shows a plot 900 illustrating threshold offset determination according to the error rate of detected data. As shown at point 910, the minimum number of raw data bit errors (2) was obtained when a notch threshold offset value of −17 dB down from the averaged between-notch spectral level was chosen. As illustrated at point 912, a notch threshold offset value of −14 dB resulted in 3 data bit errors. Also, as illustrated at point 914, a notch threshold offset value of −20 dB resulted in 5 data bit errors.

Figure 10:
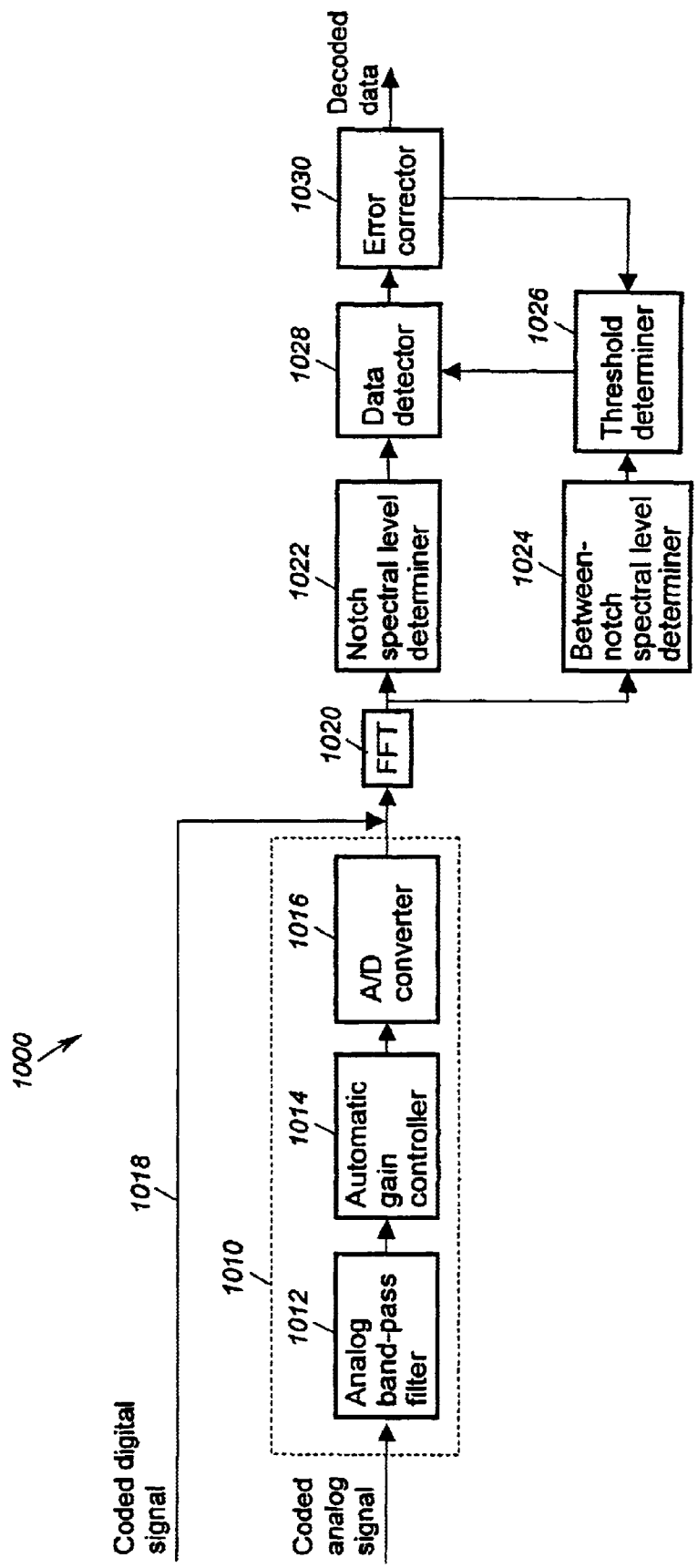
FIG. 10 shows a block diagram of a decoding system for decoding data from a signal in which the data was encoded using notch depth modulation.

Referring now to FIG. 10, that figure shows a block diagram for a decoding system 1000 for decoding data from a signal in which the data was encoded using notch depth modulation.

The decoding system 1000 includes a digitizer 1010, which includes an analog band-pass filter 1012 coupled to an automatic gain controller 1014, which in turn is coupled to an A/D converter 1016. The digitizer 1010 accepts a coded analog signal as input. The digitizer 1010 accepts a coded analog signal as input and outputs a coded digital signal corresponding to the coded analog signal.

The decoding system 1000 also includes a Fast Fourier Transform (FFT) circuit 1020 which is coupled to the output of the digitizer 1010. The output of the FFT circuit 1020 is coupled to a notch spectral level determiner 1022 and a between-notch spectral level determiner 1024. The output of the between-notch spectral level determiner 1024 is coupled to a threshold determiner 1026. The outputs of the threshold determiner 1026 and the notch spectral level determiner 1022 are coupled to a data detector 1028. The output of the data detector 1028 is coupled to an error corrector 1030, the output of which is coupled back to the threshold determiner 1026.

The FFT circuit 1020 converts the coded digital signal output from the digitizer 1010 into a frequency domain representation. The notch spectral level determiner 1022 determines the spectral components of the coded signal at each of the set of selected notch frequencies.

The between-notch spectral level determiner 1024 determines the spectral components of the coded signal between each of the set of selected notch frequencies. The decoding system 1000 preferably implements the notch spectral level determiner 1022 and the between-notch spectral level determiner 1024 using a processor executing software instructions.

The threshold determiner 1026 receives between-notch spectral level information from the between-notch spectral level determiner 1024 and decoded data error information from the error corrector 1030. The threshold determiner 1026 outputs notch threshold information to the data detector 1028. The decoding system 1000 preferably implements the threshold determiner 1026 using a processor executing software instructions.

The data detector 1028 receives notch threshold information from the threshold determiner 1026 and notch spectral level information from the notch spectral level determiner 1022 and uses that information to detect raw data in the coded signal.

The error corrector 1030, preferably a Reed-Solomon error corrector, receives the raw data from the data detector 1028. The error corrector 1030 decodes the raw data output from the data detector 1028 using error correction and outputs the decoded data. The error corrector 1030 also outputs data error information to the threshold determiner 1026, which in turn uses the data error information to adjust thresholding.

Figure 11:
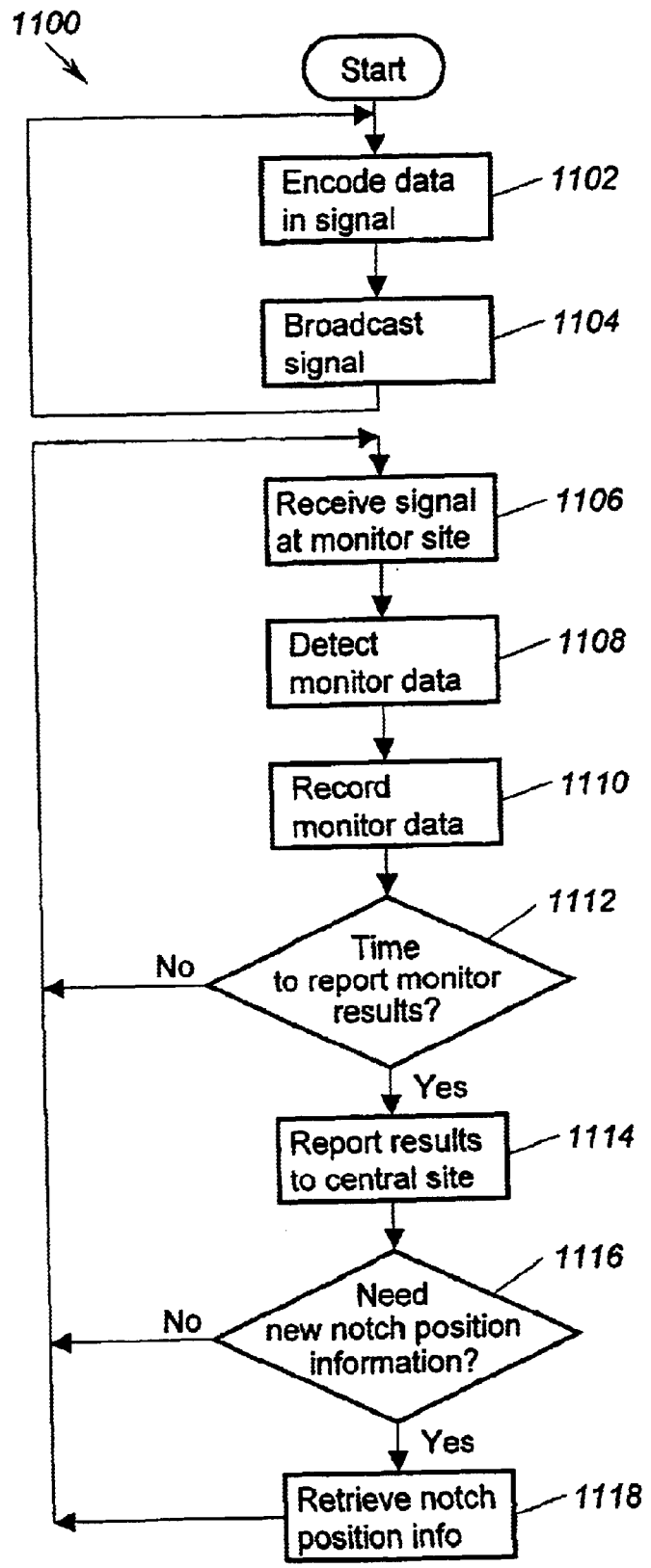
FIG. 11 illustrates a method for monitoring broadcast program information using notch depth modulation to communicate inaudible data in an audio channel.

Turning now to FIG. 11, that figure illustrates a method 1100 for monitoring broadcast program information using notch depth modulation to inaudibly communicate data in an audio channel. The method 1100 encodes monitor data, such as broadcast program identification data, into the audio signal at step 1102. The data encoding step 1102 is functionally similar to the encoding method 100 illustrated in FIG. 1.

The method 1100 then broadcasts the coded signal at the broadcast signal step 1104. The coded signal may be broadcast over a variety of media including cable, RF and optical media. The method 1100 on the broadcasting side of the broadcasting system then continues at the encode data step 1102.

At the receiving end of the broadcasting system, the method 1100 includes receiving the coded signal at the remote monitor site at step 1106.

At the detect monitor data step 1108, the method 1100 detects the monitor data that was encoded in the signal at step 1102. The detect monitor data step 1108 is functionally similar to the decoding method 500 illustrated in FIG. 5.

After the method 1100 detects the monitor data from the signal at step 1108, the method 1100 records the monitor data at step 1110. The monitor data may comprise, for example, information on commercials broadcast and information regarding broadcast viewing habits at the remote monitor site.

The method 1100 decides, at step 1112, if it is time to report the recorded results of the monitoring activity. The method 1100 preferably reports the monitoring results to a central monitoring facility or other appropriate destination at predetermined time intervals, but may also report the monitoring results to a central monitoring facility on request.

If it is not yet time to report the monitoring results, the method 1100 continues operation at the receive signal step 1106. If it is time to report the monitoring results, the method 1100 reports the monitor results to the central monitoring site at the report results step 1114.

For notch depth modulation, both the encoding and decoding systems preferably know the set of selected notch frequencies. After reporting the monitoring results, the method 1100 determines if new notch position information is needed at step 1116. If no new notch position information is needed, the method 1100 continues operation at the receive signal step 1106. If new notch position information is needed, the method 1100 retrieves new notch position information at step 1118. The method 1100 may, for example, retrieve the notch position information from the central monitor site or the broadcast site. After the method 1100 retrieves new notch position information, the method 1100 continues at the detect monitor data step 1108.

Figure 12:
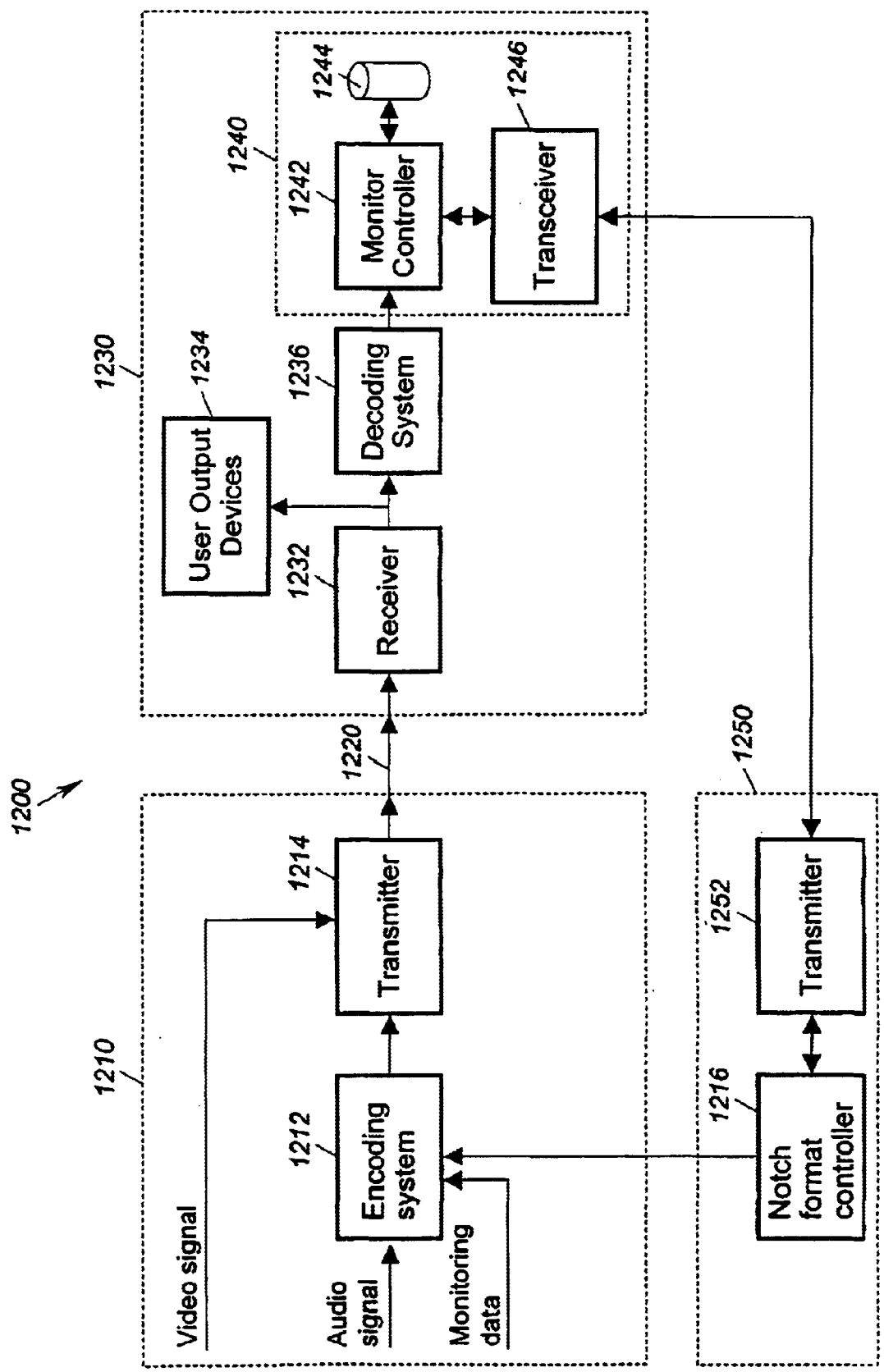
FIG. 12 shows a block diagram of a broadcast communication system for monitoring broadcast program information using notch depth modulation to communicate inaudible data in an audio channel.

Referring now to FIG. 12, that figure shows a block diagram of a television broadcast communication system 1200 for monitoring broadcast program information using notch depth modulation to communicate inaudible data in an audio channel. A front-end 1210 includes an encoding system 1212 and a broadcast transmitter 1214.

The encoding system 1212 is similar to the encoding system 400 illustrated in FIG. 4. The encoding system 1212 receives an audio signal and monitor data as input. The encoding system 1212 may also receive notch characteristic information from a notch format controller 1216. As mentioned previously, the sending and receiving sides of a communication involving notch depth modulation preferably each have information regarding notch characteristics, such as the location of selected notch frequencies.

The encoding system 1212 outputs an audio signal with the monitor data encoded therein using notch depth modulation. The broadcast transmitter 1214 receives the coded audio signal from the encoding system 1212 and a video signal and broadcasts a television signal 1220 to a broadcast group.

The broadcast group comprises a remote monitoring station 1230. The remote monitoring station 1230, in turn, comprises a broadcast receiver 1232 coupled to user output devices 1234. The broadcast receiver 1232 is also coupled to a decoding system 1236, such as the decoding system 1000 illustrated in FIG. 10. The decoding system 1236 is coupled to a broadcast monitor 1240, which in turn comprises a monitor controller 1242 coupled to a data storage device 1244 and a remote monitor transceiver 1246.

The broadcast receiver 1232 receives the television signal. The broadcast receiver 1232 provides video and audio information to the user output devices 1234, such as a video display device and sound system. The broadcast receiver 1232 also provides the audio signal, with the monitor data encoded therein, to the decoding system 1236, such as the decoding system 1000 illustrated in FIG. 10.

The decoding system 1236 decodes the monitor information from the audio signal using notch width demodulation. The decoding system 1236 provides the monitor information to the broadcast monitor 1240, which monitors the monitor information. The monitor information may include information such as broadcast verification data and audience monitor data.

The broadcast monitor 1240 includes a monitor controller 1242 which receives the monitor information from the decoding system 1236. The monitor controller logs the monitor information in the data storage device 1244 and periodically communicates the monitor information back to the central monitor site 1250 using the remote monitor transceiver 1246.

The central monitor site 1250 may be part of the front-end 1210 or completely autonomous. The central monitor site 1250 includes a central monitor transceiver 1252 which communicates with the remote monitor transceiver 1246 at the remote monitoring station 1230. The remote monitor transceiver 1246 and the central monitor transceiver 1252 preferably comprise modems.

As mentioned previously, the sending and receiving sides of a communication involving notch depth modulation each preferably have information regarding notch characteristics, such as the location of selected notch frequencies. As part of the communication of monitor information between the remote monitor station 1230 and the central monitor site 1250 the notch format controller 1216 may provide information regarding notch characteristics to the remote monitor station 1230. The decoding system 1236 of the remote monitor station 1230, in turn, uses the notch characteristic information to decode the monitor data from the audio signal.

The present invention provides a method and apparatus for encoding and decoding data using notch depth modulation. The present invention also provides a method and apparatus for utilizing notch depth modulation to communicate inaudible data in an audio signal. In an environment where narrow notches may be filtered in the spectrum of a signal virtually undetected, such as in audio signals, the present invention provides an efficient, effective and inaudible to communicate information using an existing signal.

While particular elements, embodiments and applications of the present invention have been shown and described, it will be understood that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for encoding data in a signal using notch depth modulation, the method comprising notch filtering the signal at a preselected set of frequencies in accordance with data bits to be transmitted,
    wherein said step of notch filtering the signal comprises:
        determining a respective notch depth at each of the set of notch frequencies, the respective notch depths corresponding to the data bits to be transmitted in each respective notch frequency; and
        notch filtering the signal at each of the set of notch frequencies to the respective notch depth,
        wherein said step of determining a respective notch depth comprises selecting one of $2^N$ notch depths to represent a data symbol of the data, the data symbol representing N data bits.

2. The method of claim 1, wherein notch filtering the signal further comprises determining the preselected set of notch frequencies.

3. The method of claim 2, wherein determining the set of notch frequencies comprises pseudo randomly selecting the set of notch frequencies from a predetermined set of available notch frequencies.

4. The method of claim 3, wherein selecting the set of notch frequencies comprises selecting the set of notch frequencies from a set of unevenly spaced available notch frequencies.

5. The method of claim 1, wherein said step of determining a respective notch depth comprises selecting a true notch depth to represent a logic level of true for a data bit of the data and selecting a false notch depth to represent a logic level of false for a data bit of the data.

6. The method of claim 1, wherein said step of determining a respective notch depth comprises selecting a true notch depth to represent a logic level of true for a data bit of the data and selecting a false notch depth of zero to represent a logic level of false for a data bit of the data.

7. The method of claim 1, further comprising determining a respective notch width at each of the set of notch frequencies and notch filtering the signal at each of the set of notch frequencies to the respective notch width.

8. The method of claim 7, wherein the signal is an audio signal, and wherein said step of determining a respective notch width comprises selecting a respective notch width at each of the set of notch frequencies based on a bit error rate.

9. A method for decoding data from a signal in which the data was encoded using notch depth modulation, the method comprising the steps of:

determining notch spectral levels of the signal at each of a set of selected notch frequencies;

determining notch spectral thresholds at each of the set of selected notch frequencies; and decoding the data by comparing the notch spectral levels with the corresponding notch spectral thresholds wherein said step of determining notch spectral thresholds comprises:

determining between-notch spectral levels of the signal at frequencies between each of the set of selected notch frequencies; and determining the notch spectral thresholds at each of the set of selected notch frequencies based on the determined between-notch spectral levels.

10. The method of claim 9, wherein said step of determining notch spectral thresholds comprises a step of tuning the notch spectral thresholds at each of the set of selected notch frequencies, said tuning comprising:

step 1) adjusting each notch spectral threshold;

step 2) decoding the data at each of the set of selected notch frequencies;

step 3) determining the error rate for the decoded data; and repeating steps 1, 2 and 3 until a desired error rate is achieved for the decoded data.

11. The method of claim 9, wherein said step of determining notch spectral thresholds comprises determining one notch spectral threshold at each of the set of selected notch frequencies, and wherein said step of decoding the data comprises comparing the notch spectral level with the corresponding notch spectral threshold at each of the set of selected notch frequencies.

12. The method of claim 11, wherein said step of decoding the data further comprises decoding a true data bit at each of the set of selected notch frequencies where the notch spectral level is below the notch spectral threshold and decoding a false data bit at each of the set of selected notch frequencies where the notch spectral level is not below the notch spectral threshold.

13. The method of claim 9, wherein said step of determining notch spectral thresholds comprises determining $2^N$ notch spectral thresholds corresponding to each of the set of selected notch frequencies, and wherein said step of decoding the data comprises determining data symbols at each of the set of selected notch frequencies, the data symbols each representing N bits of the data.

14. A decoding system for decoding data from a signal encoded using notch depth modulation, the system comprising:

a digitizer which accepts the signal as input and outputs a digitized signal;

a Fourier Transform processor coupled to said digitizer which converts the digitized signal to a set of spectra components;

a threshold determiner coupled to said Fourier Transform processor which determines notch thresholds from the set of spectral components; and a decoder coupled to said Fourier Transform processor and said threshold determiner which decodes the data from the signal by comparing the set of spectral components to the notch thresholds, wherein said threshold determiner comprises a between-notch spectral level determiner which determines spectral levels at frequencies between selected notch frequencies.

15. The system of claim 14, wherein said digitizer comprises:

an analog band-pass filter to filter the signal;

an automatic gain controller coupled to said analog band-pass filter which adjusts the amplitude of the filtered signal; and an A/D converter coupled to said automatic gain controller which converts the amplitude adjusted signal to the digital signal.

16. The system of claim 14, wherein said decoder comprises:

a data detector which detects raw data in the signal; and an error corrector coupled to said data detector which converts the raw data from the data detector into the decoded data.

17. The system of claim 16, wherein said error corrector is further coupled to said threshold determiner to provide data error information to said threshold determiner.

18. In a broadcast system, a method for communicating inaudible data in an audio signal, the method comprising:

notch filtering the audio signal at a set of notch frequencies to corresponding notch depths according to the data;

communicating the notch filtered audio signal to a destination; and decoding the data from the notch filtered audio signal at the destination, wherein said step of notch filtering further comprises determining each respective notch depth and each respective notch width according to data error rate and inaudibility level.

19. The method of claim 18, wherein said step of notch filtering comprises:

determining the set of notch frequencies;

determining a set of respective notch depths for each of the set of notch frequencies according to the data; and notch filtering the audio signal at each of the set of notch frequencies to according to the set of respective notch depths.

20. The method of claim 19, further comprising determining a respective notch width for each of the set of notch frequencies, and wherein said step of notch filtering the audio signal at each of the set of notch frequencies further comprises notch filtering the audio signal at each of the set of notch frequencies according to each respective notch width.

21. The method of claim 18, wherein the inaudible data comprises broadcast verification data, the method further comprising monitoring the decoded data at the destination to monitor broadcast content.

22. The method of claim 18, wherein the inaudible data comprises audience monitoring data, the method further comprising monitoring the decoded data at the destination to monitor audience broadcast receiving habits.

23. A method for encoding data in a signal using notch modulation, the method comprising the steps of:

selecting at least one notch frequency in the signal;

notch filtering the signal at notch frequency to produce a notch, wherein the depth of said notch is one of a plurality of available notch depths;

wherein each of said plurality of notch depths represents a different logical state.

24. A method for encoding data in a signal using notch modulation, the method comprising the steps of:

selecting at least one notch frequency in the signal;

notch filtering the signal at notch frequency to produce a notch, wherein the depth of said notch is one of a plurality of available notch depths;

wherein said notch filtering includes $2^N$ notch depths to represent an N-bit data symbol, wherein N is at least one.

25. A method for encoding a in a signal using notch modulation, the method comprising the steps of:

selecting at least one notch frequency in the signal;

notch filtering the signal at notch frequency to produce a notch, wherein the width of said notch is one of a plurality of available notch widths;

wherein the width of said notch may be adjusted according to measured communication parameters.

26. A method for encoding data in a signal using notch modulation, the method comprising the steps of:

selecting at least one notch frequency in the signal;

notch filtering the signal at notch frequency to produce a notch, wherein the width of said notch is one of a plurality of available notch widths;

wherein the width of said notch may be adjusted according to measured communication parameters;

and wherein said communication parameters include at least one of inaudibility, signal noise levels, and data error rates.

27. A method for encoding data in a signal using notch modulation, the method comprising the steps of:

selecting at least one notch frequency in the signal;

notch filtering the signal at notch frequency to produce a notch, wherein the width of said notch is one of a plurality of available notch widths;

wherein the width of said notch is adjustable in real time.

* * * * *